(12) United States Patent
Yokohama et al.

(10) Patent No.: US 10,233,345 B2
(45) Date of Patent: Mar. 19, 2019

(54) INK SET, RECORDING DEVICE, AND METHOD OF RECORDING

(71) Applicants: Yuuki Yokohama, Kanagawa (JP); Hiroshi Gotou, Kanagawa (JP); Kaori Toyama, Kanagawa (JP); Masayuki Fukuoka, Tokyo (JP)

(72) Inventors: Yuuki Yokohama, Kanagawa (JP); Hiroshi Gotou, Kanagawa (JP); Kaori Toyama, Kanagawa (JP); Masayuki Fukuoka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/448,014

(22) Filed: Mar. 2, 2017

(65) Prior Publication Data

US 2017/0267888 A1    Sep. 21, 2017

(30) Foreign Application Priority Data

Mar. 17, 2016 (JP) .................................. 2016-054355
Nov. 22, 2016 (JP) .................................. 2016-226667

(51) Int. Cl.
| | | |
|---|---|---|
| *B41J 2/01* | (2006.01) | |
| *C09D 11/40* | (2014.01) | |
| *C09D 11/322* | (2014.01) | |
| *C09D 11/36* | (2014.01) | |
| *C09D 11/106* | (2014.01) | |
| *C09D 11/324* | (2014.01) | |

(52) U.S. Cl.
CPC ............ *C09D 11/40* (2013.01); *B41J 2/01* (2013.01); *C09D 11/106* (2013.01); *C09D 11/322* (2013.01); *C09D 11/324* (2013.01); *C09D 11/36* (2013.01)

(58) Field of Classification Search
None
See application file for complete search history.

(56) References Cited

U.S. PATENT DOCUMENTS

| | | | |
|---|---|---|---|
| 2010/0028625 A1* | 2/2010 | Kagata | ................ C09D 11/322 428/195.1 |
| 2011/0057986 A1* | 3/2011 | Ikoshi | ................ C09B 67/0013 347/21 |
| 2011/0318543 A1 | 12/2011 | Goto | |
| 2012/0128949 A1 | 5/2012 | Goto | |
| 2012/0262517 A1* | 10/2012 | Takaku | ................ C09D 11/322 347/20 |
| 2012/0320137 A1 | 12/2012 | Fujii et al. | |
| 2013/0101814 A1 | 4/2013 | Gotou et al. | |

(Continued)

FOREIGN PATENT DOCUMENTS

JP    2015-048463    3/2015

*Primary Examiner* — Erica Lin

(74) *Attorney, Agent, or Firm* — Oblon, McClelland, Maier & Neustadt, L.L.P.

(57) ABSTRACT

An ink set includes an ink A including water, a first organic solvent, and a first pigment and an ink B including water, a second organic solvent, a second pigment, and a urethane resin particle. The first organic solvent includes at least one of N,N-dimethyl-β-buthoxy propionamide, N,N-dimethyl-β-methoxy propionamide, and 3-ethyl-3-hydroxymethyl oxetane and has a mixing solubility parameter A of 10.00 to less than 13.00 and the second organic solvent has a mixing solubility parameter B of 13.00 to 16.00.

18 Claims, 1 Drawing Sheet

(56) References Cited

U.S. PATENT DOCUMENTS

| | | |
|---|---|---|
| 2013/0143008 A1 | 6/2013 | Gotou et al. |
| 2013/0157826 A1* | 6/2013 | Preckel ................. B41M 3/008 493/53 |
| 2013/0169724 A1 | 7/2013 | Gotou |
| 2014/0198160 A1 | 7/2014 | Harada et al. |
| 2015/0056425 A1 | 2/2015 | Nagai et al. |
| 2015/0079358 A1 | 3/2015 | Gotou et al. |
| 2015/0103116 A1 | 4/2015 | Gotou |
| 2015/0252203 A1 | 9/2015 | Matsuyama et al. |
| 2015/0283828 A1 | 10/2015 | Aoai et al. |
| 2015/0291817 A1 | 10/2015 | Katoh et al. |
| 2016/0017075 A1 | 1/2016 | Harada et al. |
| 2016/0032037 A1 | 2/2016 | Harada et al. |
| 2016/0075892 A1 | 3/2016 | Harada et al. |
| 2016/0102162 A1 | 4/2016 | Harada et al. |
| 2016/0130452 A1 | 5/2016 | Katoh et al. |
| 2016/0168292 A1 | 6/2016 | Fukuoka et al. |
| 2016/0222234 A1 | 8/2016 | Matsuyama et al. |
| 2016/0272828 A1 | 9/2016 | Takamura et al. |
| 2016/0333208 A1 | 11/2016 | Gotou et al. |
| 2016/0362572 A1 | 12/2016 | Matsuyama et al. |
| 2016/0376455 A1 | 12/2016 | Katoh et al. |

\* cited by examiner

INK SET, RECORDING DEVICE, AND METHOD OF RECORDING

CROSS-REFERENCE TO RELATED APPLICATIONS

This patent application is based on and claims priority pursuant to 35 U.S.C. § 119 to Japanese Patent Application Nos. 2016-054355 and 2016-226667, filed on Mar. 17, 2016 and Nov. 22, 2016, respectively, in the Japan Patent Office, the entire disclosures of which are hereby incorporated by reference herein.

BACKGROUND

Technical Field

The present invention relates to an ink set, a recording device, and a method of recording an image on a recording medium.

Description of the Related Art

Inkjet printers utilizing inkjet recording methods are appealing and rapidly diffusing because of its advantages such as size, cost-effectiveness, and easy colorization. In addition, high performance production of ink recorded matters with high quality has been demanded. To meet this demand, ink for use in inkjet recording methods is required to satisfy various requisites.

For inkjet recording, dye ink is typically used. However, such dye ink is not weatherproof or its image density is not sufficient. Accordingly, pigment ink is now widely used to solve such problems. However, pigment ink has its own drawback such that when pigment ink is dried inside a printer, in particular, a head, drying of the pigment ink is accelerated so that the pigment ink is thickened and aggregated, causing clogging in nozzles.

In addition, since pigment ink stays on the surface of paper, the image density is high but abrasion resistance is not sufficient. In particular, in the case of paper such as coated paper tends not to absorb ink in comparison with plain paper, pigment particles in ink stay on the surface of paper. This leads to deterioration of drying property and abrasion resistance.

In addition, printers using a line head starts diffusing in terms of printing speed and productivity of printed matters. Such printers are required to improve reliability, which is maintenance and drying property, in comparison with typical printers. Also, ink is required to contribute to improvement of performance.

In particular, when images are formed by two or more color inks, a large amount of ink is required to obtain a desired color in some occasions. In such a case, bleeding is a large issue.

As the ink, ink sets including at least one of 3-ethyl-3-hydroxydimethyloxetane, N,N-dimethyl-β-methoxy propionamide, and N,N-dimethyl-β-buthoxy propionamide as water-soluble solvent have been proposed.

Good coloring is obtained using typical ink but bleeding in regarding coated paper not suitable for inkjet is not prevented.

SUMMARY

According to the present invention, provided is an improved ink set which includes an ink A including water, a first organic solvent, and a first pigment and an ink B including water, a second organic solvent, a second pigment, and a urethane resin particle. The first organic solvent includes at least one of N,N-dimethyl-β-buthoxy propionamide, N,N-dimethyl-β-methoxy propionamide, and 3-ethyl-3-hydroxymethyl oxetane and the first organic solvent has a mixing solubility parameter A of 10.00 to less than 13.00 and the second organic solvent has a mixing solubility parameter B of 13.00 to 16.00.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
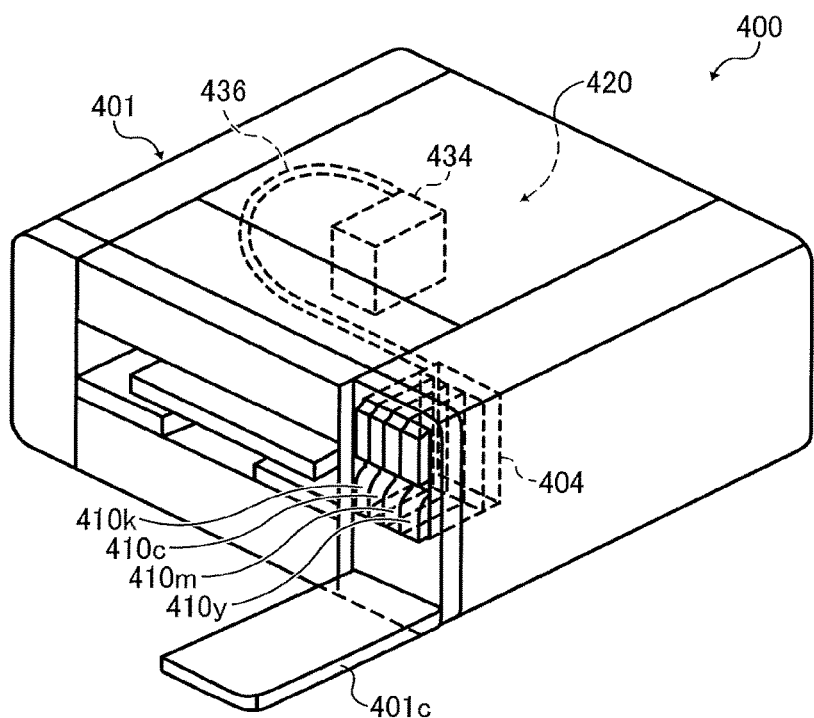
FIG. 1 is a diagram illustrating an example of the recording device according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise. Moreover, image forming, recording, printing, modeling, etc. in the present disclosure represent the same meaning, unless otherwise specified.

The present invention relates to an ink set described in the following 1.

1. An ink set including an ink A including water, a first organic solvent, and a first pigment and an ink B including water, a second organic solvent, a second pigment, and a urethane resin particle. The first organic solvent includes at least one of N,N-dimethyl-β-buthoxy propionamide, N,N-dimethyl-β-methoxy propionamide, and 3-ethyl-3-hydroxymethyl oxetane and the first organic solvent has a mixing solubility parameter A of 10.00 to less than 13.00 and the second organic solvent has a mixing solubility parameter B of 13.00 to 16.00.

The present disclosure also includes 2 to 12 below as embodiments of the present disclosure. Therefore, these are described as well.

2. The ink set 1 described above, wherein the difference (B−A) between the mixing solubility parameter B and the mixing solubility parameter A is 2.00-5.00.

3. The ink set according to 1 or 2 described above, wherein the urethane resin particle includes polyether-based urethane.

4. The ink set according to any one of 1 to 3 mentioned above, wherein the urethane resin particle accounts for 2 to 6 percent by mass of the ink B.

5. The ink set according to any one of 1 to 4 described above, wherein the ratio (X/Y) of the total mass content ratio X of N,N-dimethyl-β-buthoxy propionamide, N,N-dimethyl-β-methoxy propionamide, and 3-ethyl-3-hydroxymethyl oxetane to the ink A to the mass content ratio Y of the urethane resin particle to the ink B is 5.0 to 10.0.

6. The ink set according to any one of 1 to 5 described above, wherein the second organic solvent substantially includes none of N,N-dimethyl-β-buthoxy propionamide, N,N-dimethyl-β-methoxy propionamide, and 3-ethyl-3-hydroxymethyl oxetane.

7. The ink set according to any one of 1 to 6 described above, wherein the ink B includes yellow ink.

8. The ink set according to 7 described above, wherein the yellow ink includes Pigment Yellow 74.

9. The ink set according to 7 or 8 described above, wherein the ink A includes cyan ink. 10. The ink set according to any one of 1 to 9 described above, wherein the first pigment and the second pigment are resin-coated.

11. A recording device including a first ink accommodating unit to include an ink A including water, a first organic solvent, and a first pigment; and a second ink accommodating unit to include an ink B including water, a second organic solvent, a second pigment, and a urethane resin particle. The first organic solvent includes at least one of N,N-dimethyl-β-buthoxy propionamide, N,N-dimethyl-β-methoxy propionamide, and 3-ethyl-3-hydroxymethyl oxetane. The first organic solvent also has a mixing solubility parameter (SP) A of 10.00 to less than 13.00 and the second organic solvent has a mixing solubility parameter (SP) B of 13.00 to 16.00.

12. A method of recording an image on a recording medium, including applying an ink A to the recording medium, the ink A including water, a first organic solvent, and a first pigment; and applying an ink B to the recording medium in such a manner that the B at least partially overlaps the ink A, the ink B including water, a second organic solvent, a second pigment, and a urethane resin particle. The first organic solvent includes at least one of N,N-dimethyl-β-buthoxy propionamide, N,N-dimethyl-β-methoxy propionamide, and 3-ethyl-3-hydroxymethyl oxetane. The first organic solvent has a mixing solubility parameter (SP) A of 10.00 to less than 13.00 and the second organic solvent has a mixing solubility parameter (SP) B of 13.00 to 16.00.

The ink set of the present disclosure includes an ink A including water, a first organic solvent, and a first pigment, and an ink B including water, a second organic solvent, a second pigment, and a urethane resin particle. The first organic solvent includes at least one of N,N-dimethyl-β-buthoxy propionamide, N,N-dimethyl-β-methoxy propionamide, and 3-ethyl-3-hydroxymethyl oxetane and has a mixing solubility parameter (SP) A of 10.00 to less than 13.00 and the second organic solvent has a mixing solubility parameter (SP) B of 13.00 to 16.00.

When the ink A contacts the ink B during printing with the ink set of the present disclosure, the first organic solvent contained in the ink A thickens and aggregates the urethane resin contained in the ink B. As a consequence, moving of ink droplets is suppressed so that blurring is reduced to solve the bleeding problem. After applying the ink A to a recording medium, the ink B is applied to the recording medium in such a manner that the ink B at least partially overlaps the ink A.

Ink

The organic solvent, water, coloring material, resins, and additives for use in the ink are described next.

Organic Solvent

The organic solvent (first organic solvent) contained in the ink A includes N,N-dimethyl-β-buthoxy propionamide (SP value: 9.03), N,N-dimethyl-β-methoxy propionamide (SP value: 9.19), or 3-ethyl-3-hydroxymethyl oxetane (SP value: 11.31). In addition, the mixing solubility parameter (SP) value A of the first organic solvent contained in the ink A is 10.00 to less than 13.00.

If the mixing solubility parameter (SP) value A is within the range, the first organic solvent is capable of thickening and aggregating the urethane resin in the ink B when both contacts. When the mixing SP value A is less than 10.00, the ink may be unstable over time. When the mixing SP value A is not less than 13.00, bleeding is not improved.

In addition, if the mixing SP value A of the first organic solvent contained in the ink A is 10.00 to less than 13.00, solvents other than the three mentioned above can be used in combination as the solvent for use in the ink A.

There is no specific limitation to the organic solvent (second organic solvent) contained in the ink B as long as the mixing SP value B of the organic solvent is 13.00-16.00. For example, water-soluble organic solvents can be used. Examples are polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

To serve as a humectant and impart a good drying property, it is preferable to use an organic solvent having a boiling point of 250 degrees C. or lower.

The difference (B−A) between the mixing SP value B and the mixing SP value A is preferably 2.00-5.00.

When the difference is 2.00 or greater, ink stability over time and bleeding strike a balance. When the difference is 5.00 or less, image density and bleeding strike a balance.

The solubility parameter (SP) value is defined by the regular solution theory introduced by Hildebrand and indicates the solubility of a two-component system solution.

In addition, the SP value in the present disclosure is calculated by Fedors method. The SP value is represented by root square of the cohesion energy density in the regular solution theory and the unit is $(ca/cm^3)^{0.5}$. It can be calculated by simple software available on the market.

The mixing SP value for use in the present disclosure can be calculated based on molar ratio of each organic solvent in ink. The organic solvent for use in the calculation of the mixing SP value includes no water and accounts for 2 percent by mass of the entire ink.

It is preferable that the organic solvent (second organic solvent) contained in the ink B substantially include none of N,N-dimethyl-β-buthoxy propionamide, N,N-dimethyl-β-methoxy propionamide, and 3-ethyl-3-hydroxymethyl oxetane in terms of ink stability over time. If a urethane resin and the organic solvents are contained in the ink B simultaneously, the ink stability over time may be unstable. "Substantially include none of N,N-dimethyl-β-buthoxy propionamide, N,N-dimethyl-β-methoxy propionamide, and 3-ethyl-3-hydroxymethyl oxetane" means that the organic solvents account for less than 1 percent by mass of the entire of the ink B.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethyleneglycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

The polyol compounds having eight or more carbon atoms and glycolether compounds enhance permeability of ink when paper is used as a print medium (recording medium).

The proportion of the organic solvent in ink has no particular limit and can be suitably selected to suit to a particular application.

In terms of the drying property and discharging reliability of the ink, the proportion is preferably 10-60 percent by mass and more preferably 20-60 percent by mass.

Water

The proportion of water in the ink is not particularly limited and can be suitably selected to suit to a particular application. For example, in terms of the drying property and discharging reliability of the ink, the proportion is preferably 10-90 percent by mass and more preferably 20-60 percent by mass.

Urethane Resin Particle

In the present disclosure, the ink B includes a urethane resin particle. The urethane resin particle is present as oil in water (O/W) type emulsion when used for the ink B.

Urethane resin emulsions are classified into emulsions prepared by emulsifying a typical polyurethane resin having a relatively hydrophillic property using an emulsifier as exterior and self-emulsification type emulsions prepared by introducing a functional group serving as an emulsifier into a resin by means of copolymerization, etc. Both emulsions can be used in the present disclosure.

As the urethane resin, polyester-based urethane resins and polycarbonate-based resins are usable in the present disclosure. Polyether-based urethane resin emulsions are preferable in terms of thickening and agglomeration when contacting the organic solvent of the ink A.

The proportion of the urethane resin particle is preferably from 2 to 6 percent by mass. When the proportion is 2 percent by mass or more, bleeding can be sufficiently prevented by the urethane resins. When the proportion is 6 percent by mass or less, ink stability over time is good.

When the ratio (X/Y) of the total mass content ratio X of N,N-dimethyl-β-buthoxy propionamide, N,N-dimethyl-β-methoxy propionamide, and 3-ethyl-3-hydroxymethyl oxetane to the ink A to the mass content ratio Y of the urethane resin particle to the ink B is 5.0 to 10.0, bleeding is reduced, which is preferable.

Pigment

As the pigment (first pigment and second pigment), both inorganic pigments and organic pigments can be used. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

In the present disclosure, it is preferable that the ink B be yellow ink and the ink A be cyan ink. In general, when images are formed with two or more colors, bleeding tends to be noticeable in the case of green images formed of yellow ink and cyan ink. Therefore, when the ink B is yellow ink and the ink A is cyan ink, a better improvement is obtained in the present disclosure.

The yellow ink preferably includes Pigment Yellow 74. In general, of the yellow pigments, Pigment Yellow 74 is not sufficient with regard to chemical resistance, so that ink stability over time may be unstable if the mixing SP value of the ink B is small.

In addition, when the ink B contacts the ink A having a small mixing SP value A on an image, dispersion of the pigment (second pigment) of the ink B is destabilized by the organic solvent of the ink A. Due to the synergy effect, bleeding can be more reduced.

The pigment (first pigment) contained in the ink A and the pigment (second pigment) contained in the ink B are preferably resin-coated. When a resin-coated pigment is used, abrasion resistance can be good.

The proportion of the coloring material in the ink is preferably 0.1-15 percent by mass and more preferably 1-10 percent by mass in terms of enhancement of image density, fixability, and discharging stability.

To obtain an ink by dispersing a pigment, for example, a hydrophilic functional group is introduced into the pigment to prepare a self-dispersible pigment, the surface of the pigment is coated with a resin followed by dispersion, or a dispersant is used to disperse the pigment.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of the pigment with resin, the pigment is encapsulated by microcapsules to make the pigment dispersible in water. This can be referred to as a resin-coated pigment. In this case, all the pigments to be added to ink are not necessarily entirely coated with a resin. Pigments partially or wholly uncovered with a resin may be dispersed in the ink unless the pigments have an adverse impact.

In a method of using a dispersant to disperse a pigment, for example, a known dispersant of a small molecular weight or a large molecular weight, which is represented by a surfactant, is used to disperse the pigment in ink.

As the dispersant, it is possible to select, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

The ink can be obtained by mixing a pigment with materials such as water and organic solvent. It is also possible to mix a pigment with water, a dispersant, etc., first to prepare a pigment dispersion and thereafter mix the pigment dispersion with materials such as water and organic solvent to manufacture ink.

The pigment dispersion is obtained by mixing and dispersing water, a pigment, a pigment dispersant, and other optional components and adjusting the particle size. It is good to use a dispersing device for dispersion.

The particle diameter of the pigment in the pigment dispersion has no particular limit. For example, the maximum frequency in the maximum number conversion is preferably from 20 to 500 nm and more preferably from 20 to 150 nm to improve dispersion stability of the pigment and ameliorate the discharging stability and image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the proportion is preferably 0.1-50 percent by mass and more preferably 0.1-30 percent by mass.

It is preferable that the pigment dispersion be filtered with a filter, a centrifuge, etc. to remove coarse particles and thereafter degassed.

Resin

The kind of resins contained in the ink A and the kind of resins contained in the ink B in addition to the urethane resin have no particular limit and can be suitably selected to suit to a particular application. Specific examples thereof include, but are not limited to, urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins.

Particles of such resins may be also used. It is possible to mix a resin emulsion in which the resin particles are dispersed in water serving as a dispersion medium with materials such as a coloring material and an organic solvent to obtain ink. The resin particle can be synthesized or is available on the market. These can be used alone or in combination.

Additive Agent

Ink may further optionally contain a surfactant, a defoaming agent, a preservative and fungicide, a corrosion inhibitor, a pH regulator, etc.

Surfactant

Examples of the surfactant are silicone-based surfactants, fluorochemical surfactants, amphoteric surfactants, nonionic surfactants, anionic surfactants, etc.

The silicone-based surfactant has no specific limit and can be suitably selected to suit to a particular application.

Of these, preferred are silicone-based surfactants which are not decomposed even in a high pH environment. Specific examples thereof include, but are not limited to, side-chain-modified polydimethylsiloxane, both-distal end-modified polydimethylsiloxane, one-distal-end-modified polydimethylsiloxane, and side-chain-both-distal-end-modified polydimethylsiloxane. A silicone-based surfactant having a polyoxyethylene group or a polyoxypropylene group is particularly preferable because such an agent demonstrates good characteristics as an aqueous surfactant. It is possible to use a polyether-modified silicone-based surfactant as the silicone-based surfactant. An example is a compound in which a polyalkylene oxide structure is introduced into the side chain of the Si site of dimethyl silooxane.

Specific examples of the fluorochemical surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because they do not easily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactants has no particular limit and can be suitably selected to suit to a particular application. Specific examples thereof include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good characteristics as an aqueous surfactant.

Any suitably synthesized surfactant and any product thereof available on the market is suitable. Products available on the market can be obtained from Byc Chemie Japan Co., Ltd., Shin-Etsu Silicone Co., Ltd., Dow Corning Toray Co., Ltd., etc., NIHON EMULSION Co., Ltd., Kyoeisha Chemical Co., Ltd., etc.

The polyether-modified silicon-containing surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

Chemical formula S-1

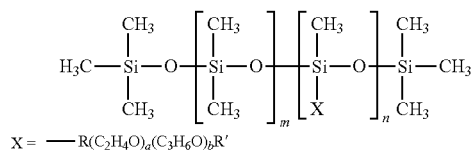

In the Chemical formula S-1, "m", "n", "a", and "b" each, respectively represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

A fluorochemical surfactant in which the number of carbon atoms replaced with fluorine atoms is 2-16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because they do not foam easily and the fluorosurfactant represented by the following Chemical formula F-1 or Chemical formula F-2 is more preferable.

Chemical formula F-1

In the Chemical formula F-1, "m" is preferably 0 or an integer of from 1 to 10 and "n" is preferably 0 or an integer of from 1 to 40.

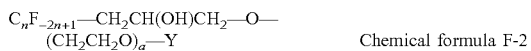

Chemical formula F-2

In the compound represented by the chemical formula F-2, Y represents H or $C_mF_{2m+1}$, where m represents an integer of 1-6, or $CH_2CH(OH)CH_2-C_mF_{2m+1}$, where m represents an integer of 4-6, or $C_pH_{2p+1}$, where p is an integer of 1-19, n represents an integer of from 1 to 6. "a" represents an integer of 4-14.

As the fluorochemical surfactant, products available on the market may be used.

Specific examples include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in ink is not particularly limited and can be suitably selected to suit to a particular application. It is preferably 0.001-5 percent by mass and more preferably 0.05-5 percent by mass in terms of enhancement of wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of breaking foams.

Preservatives and Fungicides

The preservatives and fungicides are not particularly limited. A specific example is 1,2-benzisothiazoline-3-on.

Corrosion Inhibitor

The corrosion inhibitor has not particular limitation. Examples are acid sulfite and sodium thiosulfate.

pH Regulator

The pH regulator has no particular limit. It is preferable to adjust the pH to 7 or higher. Specific examples thereof include, but are not limited to, amines such as diethanol amine and triethanol amine.

The present disclosure includes an ink including water, a first organic solvent, and a first pigment to form images together with the ink B including water, a second organic solvent, a second pigment, and a urethane resin particle. The first organic solvent includes at least one of N,N-dimethyl-$\beta$-buthoxy propionamide, N,N-dimethyl-$\beta$-methoxy propionamide, and 3-ethyl-3-hydroxymethyl oxetane.

The first organic solvent has a mixing solubility parameter (SP) A of 10.00 to less than 13.00 and the second organic solvent has a mixing solubility parameter (SP) B of 13.00 to 16.00.

The present disclosure also includes an ink including water, a second organic solvent, a second pigment, and a urethane resin particle to form images together with the ink A including water, a first organic solvent, and a first pigment. The first organic solvent includes at least one of N,N-dimethyl-$\beta$-buthoxy propionamide, N,N-dimethyl-$\beta$-methoxy propionamide, and 3-ethyl-3-hydroxymethyl oxetane.

The first organic solvent has a mixing solubility parameter (SP) A of 10.00 to less than 13.00 and the second organic solvent has a mixing solubility parameter (SP) B of 13.00 to 16.00.

The property of the ink is not particularly limited and can be suitably selected to suit to a particular application. For example, viscosity, surface tension, pH, etc, are preferable in the following ranges.

The viscosity of the ink at 25 degrees C. is preferably 5-30 mPa·s and more preferably 5-25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1°34'×R24)

Sample liquid amount: 1.2 mL

Number of rotations: 50 rotations per minute (rpm)

25 degrees C.

Measuring time: three minutes

The surface tension of the ink is preferably 35 mN/m or less and more preferably 32 mN/m or less at 25 degrees C. in terms that the ink is suitably levelized on a recording medium and the drying time of the ink is shortened.

The pH of the ink is preferably 7-12 and more preferably 8-11 in terms of prevention of corrosion of metal materials including the ink.

Recording Medium

The recording medium for use in recording is not particularly limited. Specific examples thereof include, but are not limited to, plain paper, gloss paper, special paper, cloth, film, transparent sheets, printing paper for general purpose.

The recording medium is not limited to articles used as typical recording media. It is suitable to use building materials such as wall paper, floor material, and tiles, cloth for apparel such as T-shirts, textile, and leather as the recording medium. In addition, the configuration of the paths through which the recording medium is conveyed can be adjusted to use ceramics, glass, metal, etc.

Recorded Matter

The recorded matter of the present disclosure includes a recording medium and an image formed on the recording medium with the ink of the present disclosure.

An inkjet recording device and an inkjet recording method are used to record the image on the recording medium to obtain the recorded matter.

Recording Device and Recording Method

The ink of the present disclosure can be suitably applied to various recording devices employing an inkjet recording method, such as printers, facsimile machines, photocopiers, multifunction peripherals (serving as a printer, a facsimile machine, and a photocopier), and 3D model manufacturing devices (3D printers, additive manufacturing device).

In the present disclosure, the recording device and the recording method respectively represent a device capable of discharging ink, various processing fluids, etc. to a recording medium and a method of recording an image on the recording medium using the device. The recording medium means an article to which ink or various processing fluids can be attached at least temporarily.

The recording device may further optionally include a device relating to feeding, conveying, and ejecting the recording medium and other devices referred to as a preprocessing device, a post-processing device, etc. in addition to the head portion to discharge the ink.

The recording device and the recording method may further optionally include a heater for use in the heating process and a drier for use in the drying process. For example, the heating device and the drying device include devices including heating and drying the print surface of a recording medium and the opposite surface thereof. The heating device and the drying device are not particularly limited. For example, a fan heater and an infra-red heater can be used. Heating and drying can be conducted before, in the middle of, and after printing.

In addition, the recording device and the recording method are not limited to those producing meaningful visible images such as texts and figures with the ink. For example, the recording device and the recording method can produce patterns like geometric design and 3D images.

In addition, the recording device includes both a serial type device in which the liquid discharging head is caused to move and a line type device in which the liquid discharging head is not moved, unless otherwise specified.

Figure 2:
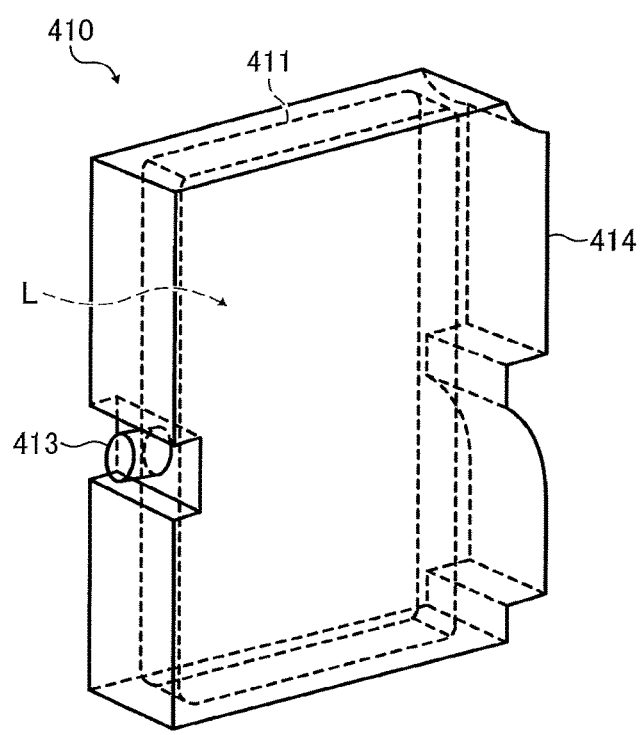
FIG. 2 is a diagram illustrating a perspective view of a main tank to accommodate the ink in the ink set according to an embodiment of the present disclosure.

Furthermore, in addition to the desktop type, this recording device includes a wide device capable of printing images on a large recording medium such as A0 and a continuous printer capable of using continuous paper wound up in a roll form as recording media. The recording device of the present disclosure is described using an example with reference to FIG. 1 and FIG. 2. FIG. 1 is a perspective view of the recording device. FIG. 2 is a diagram illustrating a perspective view of the main tank. An image forming apparatus 400 as an example of the recording device is a serial type image forming apparatus. A mechanical unit 420 is disposed in an exterior 401 of the image forming apparatus 400.

Each ink accommodating unit (ink container) 411 of each main tank 410 (410k, 410c, 410m, and 410y) for each color of black (K), cyan (C), magenta (M), and yellow (Y) is made of a packing member such as aluminum laminate film. The ink accommodating unit 411 is accommodated in, for example, a plastic housing unit 414. As a result, the main tank 410 is used as an ink cartridge of each color.

A cartridge holder 404 is disposed on the rear side of the opening when a cover 401c is opened. The cartridge holder 404 is detachably attached to the main tank 410. As a result, each ink discharging outlet 413 of the main tank 410 communicates with a discharging head 434 (e.g., first discharging head, second discharging head) for each color via a supplying tube 436 for each color so that the ink can be discharged from the discharging head 434 to a recording medium.

This recording device may include not only a portion to discharge ink but also a device referred to as a pre-processing device, a post-processing device, etc.

As an example of the pre-processing device and the post-processing device, as in the case of the ink such as black (K), cyan (C), magenta (M), and yellow (Y), the pre-processing device and the post-processing device may further include a liquid accommodating unit including a pre-processing fluid and/or a post-processing fluid to discharge the pre-processing fluid and/or the post-processing fluid according to an inkjet printing method.

As another example of the pre-processing device and the post-processing device, it is suitable to dispose a pre-processing device and a post-processing device which do not employ the inkjet printing method but a blade coating method, a roll coating method, or a spray coating method.

Pre-Processing Fluid

The pre-processing fluid includes a flocculant, an organic solvent, water, and optional materials such as a surfactant, a defoaming agent, a pH regulator, a preservatives and fungicides and a corrosion inhibitor.

The organic solvent, the surfactant, the defoaming agent, the pH regulator, the preservatives and fungicides, and the corrosion inhibitor can be the same material as those for use in the ink. Also, other materials for use in known processing fluid can be used.

The type of the flocculant is not particularly limited. For example, water-soluble cationic polymers, acids, and multivalent metal salts are suitable.

Processing Fluid

The post-processing fluid has no particular limit. It is preferable that the post-processing fluid can form a transparent layer. Materials such as organic solvents, water, resins, surfactants, defoaming agents, pH regulators, preservatives and fungicides, corrosion inhibitors, etc. are suitably selected based on a necessity basis and mixed to obtain the post-processing fluid. The post-processing fluid can be applied to the entire recording area formed on a recording medium or only the area on which an ink image is formed.

How to use the ink is not limited to the inkjet printing method.

Specific examples of such methods other than the inkjet printing method include, but are not limited to, blade coating methods, gravure coating methods, bar coating methods, roll coating methods, dip coating methods, curtain coating methods, slide coating methods, die coating methods, and spray coating methods.

The applications of the ink of the present disclosure are not particularly limited and can be suitably selected to suit to a particular application. For example, the ink can be used for printed matter, a paint, a coating material, and foundation. The ink can be used to form two-dimensional texts and images and furthermore a three-dimensional solid object (3D modeling object) as a material for 3D modeling.

An apparatus for fabricating a three-dimensional object can be any known device with no particular limit. For example, the apparatus includes an ink container, a supplying device, and a discharging device, a drier, etc. The three-dimensional solid object includes an object manufactured by repeating coating with ink. In addition, the three-dimensional solid object can be manufactured by processing a structure having a substrate such as a print medium printed with the ink as a molded processed product. The molded processed product is fabricated from printed matter or a structure having a sheet-like form, film-like form, etc. by, for example, heating drawing or punching.

The molded processed product is suitably used for articles which are molded after surface-decorating. Examples thereof are gauges or operation panels of vehicles, office machines, electric and electronic devices, cameras, etc.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples and Comparative Examples but not limited thereto.

Preparation Example 1

Preparation of Liquid Dispersion of Resin-Coated Black Pigment

Preparation of Polymer Solution A

After sufficient replacement with nitrogen gas in a flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethylene glycol methacrylate, 4.0 g of styrene macromer, and 0.4 g of mercapto ethanol were mixed and the system was heated to 65 degrees C.

Next, a liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercapto ethanol, 2.4 g of azobisdimethyl valeronitrile, and 18 g of methylethyl ketone was dripped into the flask in two and a half hours. Subsequently, a liquid mixture of 0.8 g of azobismethyl valeronitrile and 18 g of methylethyl ketone was dripped into the flask in half an hour. After one-hour aging at 65 degrees C., 0.8 g of azobismethyl valeronitrile was added and aged for another hour. After the reaction was complete, 364 g of methylethyl ketone was added to the flask to obtain 800 g of polymer solution A having a concentration of 50 percent by mass.

Preparation of Liquid Dispersion of Pigment Containing Polymer Particulate 28 g of the polymer solution A, 42 g of carbon black (FW100, manufactured by Degussa AG), 13.6 g of 1 mol/l potassium hydroxide aqueous solution, 20 g of methylethyl ketone, and 13.6 g of deionized water were sufficiently stirred and thereafter mixed and kneaded using a roll mill.

The thus-obtained paste was charged in 200 g of pure water followed by sufficient stirring. Thereafter, methylethyl ketone and water were distilled away using an evaporator. To remove coarse particles, the thus-obtained liquid dispersion was filtrated with a polyvinylidene fluoride membrane filter having an average hole diameter of 5.0 μm under pressure. As a result, a liquid dispersion of resin-coated black pigment was obtained which included a pigment portion in an amount of 15 percent by mass with a solid portion concentration of 20 percent by mass. The volume average particle diameter (D50) of the polymer particulate in the thus-obtained liquid dispersion of resin-coated black pigment was 104 nm. The volume average particle diameter (D50) was measured by particle size distribution measuring instrument (NANOTRAC UPA-EX150, manufactured by NIKKISO CO., LTD.)

Preparation Example 2

Preparation of Liquid Dispersion of Resin-Covered Cyan Pigment

A liquid dispersion of resin-coated cyan pigment was prepared in the same manner as in the Preparation Example 1 except that carbon black as the pigment was changed to a phthalocyanine pigment (C.I. Pigment Blue 15:3).

The average particle diameter (D50) of the polymer particulates in the thus-obtained liquid dispersion of resin-coated cyan pigment was 93 nm as measured by particle size distribution measuring instrument (NANOTRAC UPA-EX150, manufactured by NIKKISO CO., LTD.)

Preparation Example 3

Preparation of Liquid Dispersion of Resin-Coated Magenta Pigment

A liquid dispersion of resin-coated magenta pigment was prepared in the same manner as in the Preparation Example 1 except that carbon black as the pigment was changed to C.I. Pigment Red 122.

The average particle diameter (D50) of the polymer particulates in the thus-obtained liquid dispersion of resin-coated magenta pigment was 127 nm as measured by particle size distribution measuring instrument (NANOTRAC UPA-EX150, manufactured by NIKKISO CO., LTD.)

Preparation Example 4

Preparation of Liquid Dispersion of Resin-Coated Yellow Pigment

A liquid dispersion of resin-coated yellow pigment was prepared in the same manner as in the Preparation Example 1 except that carbon black as the pigment was changed to monoazo yellow pigment (C.I. Pigment Yellow 74).

The average particle diameter (D50) of the polymer particulates in the thus-obtained liquid dispersion of resin-coated yellow pigment was 76 nm as measured by particle size distribution measuring instrument (NANOTRAC UPA-EX150, manufactured by NIKKISO CO., LTD.)

Preparation Example 5

Preparation of Liquid Dispersion of Resin-Coated Yellow Pigment

A liquid dispersion of resin-coated yellow pigment was prepared in the same manner as in the Preparation Example 1 except that carbon black as the pigment was changed to C.I. Pigment Yellow 155.

The average particle diameter (D50) of the polymer particulates in the thus-obtained liquid dispersion of resin-coated yellow pigment was 80 nm as measured by particle size distribution measuring instrument (NANOTRAC UPA-EX150, manufactured by NIKKISO CO., LTD.)

Examples 1 to 6 and Comparative Examples 1 to 3

Preparation of Ink

The ink for use in the ink sets of Examples 1 to 6 and Comparative Examples 1 to 3 was manufactured according to the recipe shown in Table 1.

Each ink for recording was manufactured in the following procedure.

A water-soluble organic solvent, a permeating agent, a surfactant, and water shown in Table 1 were uniformly mixed by stirring for one hour. The liquid dispersion of pigment was added to the liquid mixture followed by one hour stirring. The thus-obtained liquid dispersion was filtrated with a polyvinilydene fluoride membrane filter having an average hole diameter of 5.0 μm under pressure to remove coarse particles and dust. As a result, each ink for recording of Examples 1 to 6 and Comparative Examples 1 and 3 were prepared. The thus-prepared ink was evaluated according to the following criteria and the results are shown in Table 1.

Ink Stability Over Time

After preparing each ink of Examples and Comparative Examples, viscosity was measured, which was determined as the pre-storage viscosity.

Thereafter, the ink was left still in a constant temperature tank of 70 degrees C. for two weeks and thereafter taken out to measure the viscosity thereof again. This measured viscosity was determined as post-storage viscosity.

The changing ratio of the post-storage viscosity to the pre-storage viscosity was calculated according to the following relation and evaluated according to the following criteria.

Viscosity change ratio (percent)={(post-storage viscosity)−(pre-storage viscosity)]/(pre-storage viscosity)}×100

The viscosity of the ink was measured by a viscometer (RE-550L, manufactured by TOKI SANGYO CO., LTD.) at 25 degrees C.

Evaluation Criteria

G (Good): Viscosity change ratio is less than 5 percent

M (Marginal): Viscosity change ratio is 5 percent to less than 10 percent

P (Poor): Viscosity change ratio is 10 percent or higher

Image Density

An inkjet printer (IPSiO GXe5500, manufactured by Ricoh Company Ltd.) was filled with each ink for recording of Examples and Comparative Example. Next, MyPaper (manufactured by Ricoh Company Ltd.) was set and a chart including 64 point text ■ (black square) created by Microsoft Word 2000 was printed. The printing mode was: a modified mode in which "Plain Paper-beautiful" was modified to "no color calibration" from a user setting for plain paper by a driver installed onto the printer. Image density of the printed matter after drying was measured using a reflection type color spectrodensitometer (manufactured by X-RITE CORPORATION) and evaluated according to the following criteria:

Evaluation Criteria
E (Excellent): Black: 1.25 or greater
  Yellow: 0.85 or greater
  Magenta: 1.05 or greater
  Cyan: 1.1 or greater
G (Good): Black: 1.2 to less than 1.25
  Yellow: 0.8 to less than 0.85
  Magenta: 1.0 to less than 1.05
  Cyan: 1.0 to less than 1.1
M (Marginal): Black: 1.15 to less than 1.2
  Yellow: 0.75 to less than 0.8
  Magenta: 0.95 to less than 1.0
  Cyan: 0.95 to less than 1.0
P (Poor): Black: less than 1.15
  Yellow: less than 0.75
  Magenta: less than 0.95
  Cyan: less than 0.95

Bleeding

A chart for use in the evaluation of the image density was used and LumiArt gloss (manufactured by STORA ENSO) was used as printing paper.

The printing mode was: a modified mode in which "Gloss Paper-beautiful" was modified to "no color calibration" from a user setting for gloss paper by a driver installed onto the printer. After applying the ink A to a recording medium, the ink B was applied to the recording medium in such a manner that the ink B at least partially overlapped the ink A.

The printed matter after drying was visually observed and evaluated according to the following criteria.

Evaluation Criteria
E (Excellent): No image bleeding observed
G (Good): Slight bleeding observed
P (Poor): Significant bleeding observed

TABLE 1

| | | Example 1 | | Example 2 | | Example 3 | |
|---|---|---|---|---|---|---|---|
| | | Ink A | Ink B | Ink A | Ink B | Ink A | Ink B |
| Liquid dispersion of pigment | Liquid dispersion of resin-coated black pigment (Preparation Example 1) | | | | | | |
| | Liquid dispersion of resin-coated cyan pigment (Preparation Example 2) | 35 | | | | | 35 |
| | Liquid dispersion of resin-coated magenta pigment (Preparation Example 3) | | | 40 | | | |
| | Liquid dispersion of resin-coated yellow pigment (Preparation Example 4) | | 35 | | 35 | 35 | |
| | Liquid dispersion of resin-coated yellow pigment (Preparation Example 5) | | | | | | |
| Water-soluble organic solvent X | N,N-dimethyl-β-methoxy propionamide (SP value: 9.19) | | | 15 | | | |
| | N,N-dimethyl-β-buthoxy propionamide (SP value: 9.03) | | | | 5 | | |
| | 3-ethyl-3-hydroxymethyl oxetane (SP value: 11.31) | 25 | | 12 | | 10 | |
| Water-soluble organic solvent | 1,2-propanediol (SP value: 13.48) | 10 | 20 | | 4 | 20 | 15 |
| | 1,2-butane diol (SP value: 12.75) | | 5 | | | | 15 |
| | 1,3-butane diol (SP value: 12.75) | | | | | | |
| | 1,3-propanediol (SP value: 13.72) | | | | | | |
| | Glycerin (SP value: 16.38) | | 5 | | 20 | | |
| Permeating agent | 2-ethyl-1,3-hexanediol | 1 | 1 | | | 1 | 1 |
| | 2,2,4-trimethyl-1,3-pentanediol | | | 1 | 1 | | |
| Surfactant | Zonyl™ FS-300 | 1 | 1 | | | 1 | 1 |
| | SOFTANOL EP-7025 | | | 1 | 1 | | |
| Urethane Resin Y | TAKELAC™ W5661 (polyether-based urethane) | | 5 | | | | 1.8 |
| | TAKELAC™ W6110 (polycarbonater-based urethane) | | | | 6 | | |
| Defoaming agent | Silicone defoaming agent KM-72F | 0.05 | 0.05 | 0.05 | 0.05 | 0.05 | 0.05 |

TABLE 1-continued

|  |  | Ink A | Ink B | Ink A | Ink B | Ink A | Ink B |
|---|---|---|---|---|---|---|---|
| Pure water |  | Rest | Rest | Rest | Rest | Rest | Rest |
| Total |  | 100 | 100 | 100 | 100 | 100 | 100 |
| Mixing SP value |  | 12.13 | 15.65 | 10.05 | 15.81 | 12.94 | 13.15 |
| Mixing SP value B − Mixing SP value A |  | 3.52 | | 5.76 | | 0.21 | |
| X/Y |  | 5.0 | | 5.3 | | 5.6 | |
| Evaluation Results | Ink stability over time | G | G | G | G | M | G |
|  | Image Density | E | E | E | M | E | E |
|  | Bleeding | E | | G | | G | |

|  |  | Example 4 | | Example 5 | | Example 6 | |
|---|---|---|---|---|---|---|---|
|  |  | Ink A | Ink B | Ink A | Ink B | Ink A | Ink B |
| Liquid dispersion of pigment | Liquid dispersion of resin-coated black pigment (Preparation Example 1) |  |  |  |  |  |  |
|  | Liquid dispersion of resin-coated cyan pigment (Preparation Example 2) | 35 |  |  | 35 | 35 |  |
|  | Liquid dispersion of resin-coated magenta pigment (Preparation Example 3) |  |  |  |  |  |  |
|  | Liquid dispersion of resin-coated yellow pigment (Preparation Example 4) |  | 35 | 35 |  |  | 35 |
|  | Liquid dispersion of resin-coated yellow pigment (Preparation Example 5) |  |  |  |  |  |  |
| Water-soluble organic solvent X | N,N-dimethyl-β-methoxy propionamide (SP value: 9.19) | 10 |  |  |  |  |  |
|  | N,N-dimethyl-β-buthoxy propionamide (SP value: 9.03) | 5 |  |  |  |  |  |
|  | 3-ethyl-3-hydroxymethyl oxetane (SP value: 11.31) | 15 |  | 20 |  | 20 |  |
| Water-soluble organic solvent | 1,2-propanediol (SP value: 13.48) |  | 15 | 4 | 10 |  | 10 |
|  | 1,2-butane diol (SP value: 12.75) |  |  |  | 10 | 5 | 10 |
|  | 1,3-butane diol (SP value: 12.75) |  | 5 |  |  |  |  |
|  | 1,3-propanediol (SP value: 13.72) |  | 5 |  | 5 |  | 5 |
|  | Glycerin (SP value: 16.38) |  | 5 |  |  |  |  |
| Permeating agent | 2-ethyl-1,3-hexanediol |  |  | 1 | 1 |  |  |
|  | 2,2,4-trimethyl-1,3-pentanediol | 1 | 1 |  |  | 1 | 1 |
| Surfactant | Zonyl ™ FS-300 |  |  |  |  | 1 | 1 |
|  | SOFTANOL EP-7025 | 1 | 1 | 1 | 1 |  |  |
| Urethane Resin Y | TAKELAC ™ W5661 (polyether-based urethane) |  | 2.5 |  | 2.5 |  | 2.5 |
|  | TAKELAC ™ W6110 (polycarbonater-based urethane) |  |  |  |  |  |  |
| Defoaming agent | Silicone defoaming agent KM-72F | 0.05 | 0.05 | 0.05 | 0.05 | 0.05 | 0.05 |
| Pure water |  | Rest | Rest | Rest | Rest | Rest | Rest |
| Total |  | 100 | 100 | 100 | 100 | 100 | 100 |
| Mixing SP value |  | 10.33 | 13.81 | 11.82 | 13.74 | 11.66 | 13.74 |
| Mixing SP value B − Mixing SP value A |  | 3.48 | | 1.92 | | 2.08 | |
| X/Y |  | 12.0 | | 8.0 | | 8.0 | |
| Evaluation Results | Ink stability over time | G | G | M | G | G | G |
|  | Image Density | E | E | E | E | E | E |
|  | Bleeding | G | | G | | G | |

TABLE 1-continued

|  |  | Comparative Example 1 | | Comparative Example 2 | | Comparative Example 3 | |
| --- | --- | --- | --- | --- | --- | --- | --- |
|  |  | Ink A | Ink B | Ink A | Ink B | Ink A | Ink B |
| Liquid dispersion of pigment | Liquid dispersion of resin-coated black pigment (Preparation Example 1) |  |  | 40 |  |  |  |
|  | Liquid dispersion of resin-coated cyan pigment (Preparation Example 2) | 35 |  |  |  | 35 |  |
|  | Liquid dispersion of resin-coated magenta pigment (Preparation Example 3) |  |  |  |  |  |  |
|  | Liquid dispersion of resin-coated yellow pigment (Preparation Example 4) |  | 35 |  |  |  | 35 |
|  | Liquid dispersion of resin-coated yellow pigment (Preparation Example 5) |  |  |  | 35 |  |  |
| Water-soluble organic solvent X | N,N-dimethyl-β-methoxy propionamide (SP value: 9.19) | 5 |  | 20 |  |  |  |
|  | N,N-dimethyl-β-buthoxy propionamide (SP value: 9.03) |  |  | 5 | 5 |  |  |
|  | 3-ethyl-3-hydroxymethyl oxetane (SP value: 11.31) |  |  | 10 | 10 |  |  |
| Water-soluble organic solvent | 1,2-propanediol (SP value: 13.48) |  | 2 |  |  |  | 25 |
|  | 1,2-butane diol (SP value: 12.75) |  |  |  | 20 | 20 |  |
|  | 1,3-butane diol (SP value: 12.75) |  |  |  |  |  | 5 |
|  | 1,3-propanediol (SP value: 13.72) | 20 |  |  |  | 5 |  |
|  | Glycerin (SP value: 16.38) | 5 | 20 |  |  | 2 | 2 |
| Permeating agent | 2-ethyl-1,3-hexanediol | 1 | 1 |  |  |  |  |
|  | 2,2,4-trimethyl-1,3-pentanediol |  |  | 1 | 1 | 1 | 1 |
| Surfactant | Zonyl ™ FS-300 |  |  | 1 | 1 | 1 | 1 |
|  | SOFTANOL EP-7025 | 1 | 1 |  |  |  |  |
| Urethane Resin Y | TAKELAC ™ W5661 (polyether-based urethane) |  |  |  | 3 |  | 3 |
|  | TAKELAC ™ W6110 (polycarbonater-based urethane) |  | 4 |  |  |  |  |
| Defoaming agent | Silicone defoaming agent KM-72F | 0.05 | 0.05 | 0.05 | 0.05 | 0.05 | 0.05 |
| Pure water |  | Rest | Rest | Rest | Rest | Rest | Rest |
| Total |  | 100 | 100 | 100 | 100 | 100 | 100 |
| Mixing SP value |  | 13.63 | 16.07 | 9.85 | 12.04 | 15.35 | 14.95 |
| Mixing SP value B − Mixing SP value A |  | 2.44 | | 2.19 | | −0.4 | |
| X/Y |  | 1.3 | | 11.7 | | 0.0 | |
| Evaluation Results | Ink stability over time | G | G | P | M | M | G |
|  | Image Density | E | E | E | M | E | E |
|  | Bleeding | P | | P | | P | |

Descriptions of the product names in Table 1 are as follows.
- Zonyl FS-300: Polyoxyethylene perfluoroalkyl ether (component 40 percent by mass, manufactured by E. I. du Pont de Nemours and Company)
- SOFTANOL EP-7025: polyoxyalkylene alkyl ether (component 100 percent by mass, manufactured by NIPPON SHOKUBAI CO., LTD.)
- KM-72F, self-emulsification type silicone defoaming agent (component: 100 percent by mass, manufactured by Shin-Etsu Silicone Co., Ltd.)
- TAKELAC™ W5661: Polyurethane resin emulsion (component 35 percent, manufactured by Mitsui Chemicals, Inc.)
- TAKELAC™ W6110: Polyurethane resin emulsion (component 31 percent, manufactured by Mitsui Chemicals, Inc.)

Moreover, image forming, recording, printing, modeling, etc. in the present disclosure represent the same meaning.

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink set comprising:
an ink A comprising water, a first organic solvent, and a first pigment; and
an ink B comprising water, a second organic solvent which is different from the first organic solvent, a second pigment, and a urethane resin particle,
wherein the first organic solvent comprises at least one of N,N-dimethyl-β-buthoxy propionamide, N,N-dimethyl-β-methoxy propionamide, and 3-ethyl-3-hydroxymethyl oxetane,
wherein the first organic solvent has a mixing solubility parameter A calculated by Fedor's method of 10.00 $(ca/cm^3)^{0.5}$ to less than 13.00 $(ca/cm^3)^{0.5}$, and
wherein the second organic solvent has a mixing solubility parameter B calculated by Fedor's method of 13.00 $(ca/cm^3)^{0.5}$ to 16.00 $(ca/cm^3)^{0.5}$.

2. The ink set according to claim 1, wherein a difference (B−A) between the mixing solubility parameter B and the mixing solubility parameter A is 2.00 $(ca/cm^3)^{0.5}$-5.00 $(ca/cm^3)^{0.5}$.

3. The ink set according to claim 1, wherein the urethane resin particle comprises polyether-based urethane.

4. The ink set according to claim 1, wherein the urethane resin particle accounts for 2 to 6 percent by mass of the ink B.

5. The ink set according to claim 1, wherein a ratio (X/Y) of a total mass content ratio X of N,N-dimethyl-β-buthoxy propionamide, N,N-dimethyl-β-methoxy propionamide, and 3-ethyl-3-hydroxymethyl oxetane to the ink A to a mass content ratio Y of the urethane resin particle to the ink B is 5.0 to 10.0.

6. The ink set according to claim 1, wherein the second organic solvent substantially includes none of N,N-dimethyl-β-buthoxy propionamide, N,N-dimethyl-β-methoxy propionamide, and 3-ethyl-3-hydroxymethyl oxetane.

7. The ink set according to claim 1, wherein the ink B is a yellow ink.

8. The ink set according to claim 7, wherein the yet comprises Pigment Yellow 74.

9. The ink set according to claim 7, wherein the ink A is a cyan ink.

10. The ink set according to claim 1, wherein the first pigment and the second pigment are resin-coated.

11. A recording device comprising:
a first ink accommodating unit configured to comprise an ink A comprising water, a first organic solvent, and a first pigment; and
a second ink accommodating unit configured to comprise an ink B comprising water, a second organic solvent, a second pigment, and a urethane resin particle,
wherein the first organic solvent comprises at least one of N,N-dimethyl-β-buthoxy propionamide, N,N-dimethyl-β-methoxy propionamide, and 3-ethyl-3-hydroxymethyl oxetane and
wherein the first organic solvent has a mixing solubility parameter (SP) A calculated by Fedor's method of 10.00 $(ca/cm^3)^{0.5}$ to less than 13.00 $(ca/cm^3)^{0.5}$ and the second organic solvent has a mixing solubility parameter (SP) B calculated by Fedor's method of 13.00 $(ca/cm^3)^{0.5}$ to 16.00 $(ca/cm^3)^{0.5}$.

12. A method of recording an image on a recording medium, comprising:
applying an ink A to the recording medium, the ink A comprising water, a first organic solvent, and a first pigment; and
applying an ink B to the recording medium in such a manner that the ink B at least partially overlaps the ink A, the ink B comprising water, a second organic solvent, a second pigment, and a urethane resin particle,
wherein the first organic solvent comprises at least one of N,N-dimethyl-β-buthoxy propionamide. N,N-dimethyl-β-methoxy propionamide, and 3-ethyl-3-hydroxymethyl oxetane and
wherein the first organic solvent has a mixing solubility parameter (SP) A calculated by Fedor's method of 10.00 $(ca/cm^3)^{0.5}$ to less than 13.00 $(ca/cm^3)^{0.5}$ and the second organic solvent has a mixing solubility parameter (SP) B calculated by Fedor's method of 13.00 $(ca/cm^3)^{0.5}$ to 16.00 $(ca/cm^3)^{0.5}$.

13. The ink set according to claim 1, wherein:
a difference (B−A) between the mixing solubility parameter B and the mixing solubility parameter A is 2.00 $(ca/cm^3)^{0.5}$-5.00 $(ca/cm^3)^{0.5}$;
the urethane resin particle accounts for 2 to 6 percent by mass of the ink B; and
a ratio (X/Y) of a total mass content ratio X of N,N-dimethyl-β-buthoxy propionamide, N,N-dimethyl-β-methoxy propionamide, and 3-ethyl-3-hydroxymethyl oxetane to the ink A to a mass content ratio Y of the urethane resin particle to the ink B is 5.0 to 10.0.

14. The ink set according to claim 13, wherein the first pigment and the second pigment are resin-coated.

15. The ink set according to claim 13, wherein the second organic solvent comprises none of N,N-dimethyl-β-buthoxy propionamide, N,N-dimethyl-β-methoxy propionamide, and 3-ethyl-3-hydroxymethyl oxetane.

16. The ink set according to claim 14, wherein the second organic solvent comprises none of N,N-dimethyl-β-buthoxy propionamide, N,N-dimethyl-β-methoxy propionamide, and 3-ethyl-3-hydroxymethyl oxetane.

17. The ink set according to claim 1, wherein the second organic solvent comprises none of N,N-dimethyl-β-buthoxy propionamide, N,N-dimethyl-β-methoxy propionamide, and 3-ethyl-3-hydroxymethyl oxetane.

18. The ink set according to claim 1, wherein a difference (B−A) between the mixing solubility parameter B and the mixing solubility parameter A is at least 0.21 $(ca/cm^3)^{0.5}$.

* * * * *